May 16, 1961 K. WEHSELY ET AL 2,984,311
REVERSIBLE DRIVING MOUNT FOR AUTOMOTIVE VEHICLES
Filed April 7, 1958 4 Sheets-Sheet 1

INVENTORS:
KARL WEHSELY
BY GOTTFRIED HAASE

AGENT

INVENTORS:
KARL WEHSELY
GOTTFRIED HAASE
BY
Karl F. Ross
AGENT

May 16, 1961 K. WEHSELY ET AL 2,984,311
REVERSIBLE DRIVING MOUNT FOR AUTOMOTIVE VEHICLES
Filed April 7, 1958 4 Sheets-Sheet 3

INVENTORS:
KARL WEHSELY
GOTTFRIED HAASE
BY
*Karl F. Ross*
AGENT

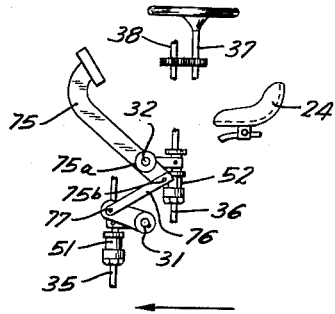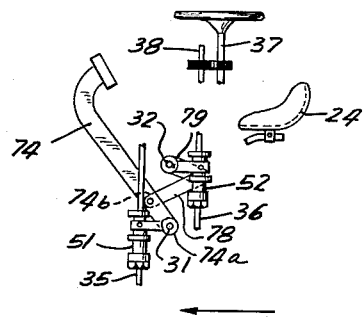
FIG. 8     FIG. 9
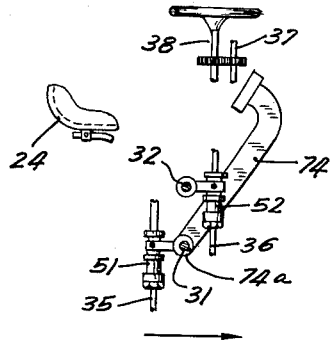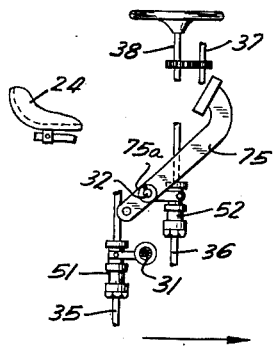
FIG. 10     FIG. 11
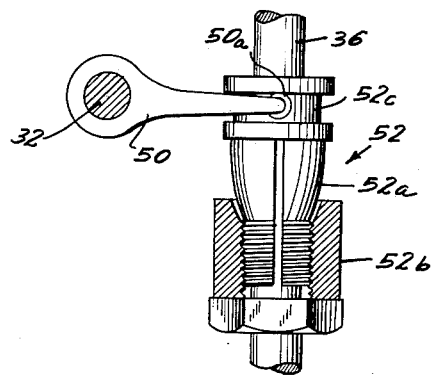
FIG. 12
INVENTORS:
KARL WEHSELY
GOTTFRIED HAASE
BY
AGENT A
United States Patent Office 2,984,311
Patented May 16, 1961

2,984,311

REVERSIBLE DRIVING MOUNT FOR AUTOMOTIVE VEHICLES

Karl Wehsely, Leipzig, and Gottfried Haase, Schonebeck (Elbe), Germany, assignors to Institut für Landmaschinen- u. Traktorenbau, Leipzig, Germany, a corporation of Germany Filed Apr. 7, 1958, Ser. No. 726,925

7 Claims. (Cl. 180—6.34)

Our present invention relates to a driving mount for automotive vehicles, especially agricultural prime movers such as tractors for combines, which need to be driven alternately in two directions.

It is an object of our invention to provide a reversible driving mount having means for so rearranging a single set of controls (such as steering wheel, throttle-control and shift levers, brake and clutch pedals) that the same may be operated in the accustomed manner by a driver facing in either of two directions.

Another object of this invention is to provide a driving mount adapted to be readily adjusted in height in order to accommodate drivers of different stature or to meet various operating requirements.

Our invention more particularly relates to a driving mount comprising a generally cylindrical control turret from which linkages extend to the usual vehicle-control units such as steering, braking and speed-changing mechanisms. This turret carries a driver's seat, which is displaceable between two diametrically opposite positions, as well as a number of controls connected with the respective mechanisms through vertical rods (consisting, for example, of a plurality of telescoped sections) of adjustable effective length. A tubular spacer is preferably insertable between the turret and its base if it is desired to increase the effective height of the latter.

A feature of our invention resides in the provision of two horizontal shafts traversing the turret and projecting therefrom with both ends, these shafts being operatively linked with the clutching mechanism and the braking mechanism, respectively, and being each adapted to carry on one of its exposed extremities either a clutch pedal or a brake pedal. In a position corresponding to one direction of travel, both pedals are directly keyed to their respective shafts; in an alternative position corresponding to travel in the opposite direction, the clutch pedal is loosely mounted on the brake shaft and operatively linked with the clutch shaft while the brake pedal is loosely mounted on the clutch shaft and operatively linked with the brake shaft. By virtue of this arrangement the relative position of the two pedals will be the same for both directions of locomotion.

The invention will be further described with reference to the accompanying drawing in which:

Figs. 8–11 are somewhat diagrammatic side-elevational views showing the clutch and brake pedals mounted for forward drive (Figs. 8, 9) and for reverse drive (Figs. 10, 11); and Fig. 12 illustrates on a larger scale the adjustable coupling between the brake shaft and its control rod.

Figure 1:
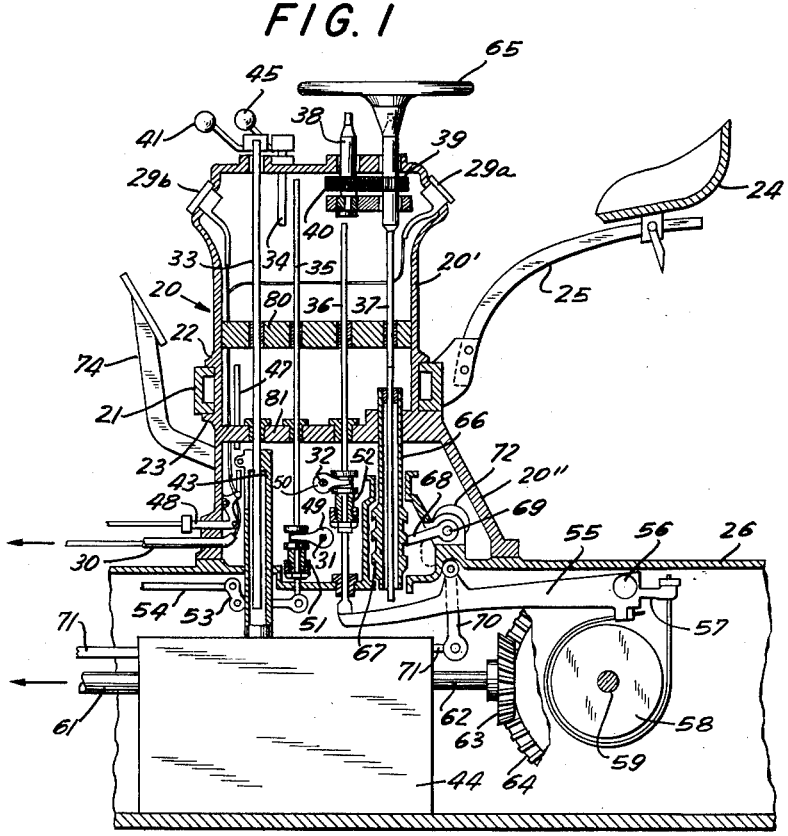
Fig. 1 is a sectional elevation of a driving mount according to the invention, with the controls positioned for travel in a forward direction.
Figure 2:
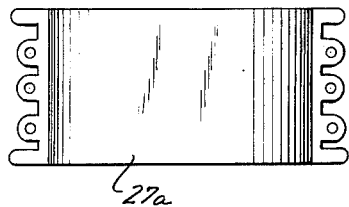
Fig. 2 is an elevational view of one half of a spacer adapted to be used to vary the height of the driving mount of Fig. 1.
Figure 3:
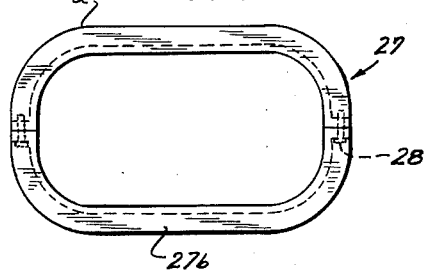
Fig. 3 is a top plan view of the same spacer.
Figure 6:
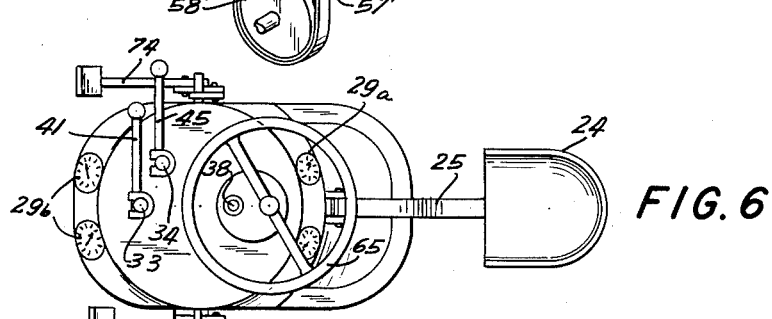
Fig. 6 is a top plan view of the assembled mount in forward-driving position.
Figure 7:
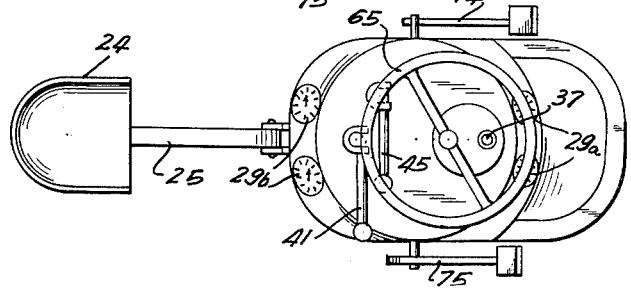
Fig. 7 is a view similar to Fig. 6 but showing the mount in position for driving in a reverse direction.

The reversible and extensible driving mount shown in the drawing comprises a cylindrical turret 20 with an upper portion 20' of at least approximately circular cross section and a lower portion 20'' of generally oval section. Upper turret portion 20' is girded by a clamping ring 21, held between flanges 22, 23, which can be loosened by means not shown and rotated through an angle of 180° so that the driver's seat 24, adjustably supported thereon through the intermediary of a stem 25, may occupy diametrically opposite positions as shown in Figs. 6 and 7. The turret 20 is secured, through suitable fastening means not shown, to a base 26 on which it can be supported either directly (Fig. 1) or through the intermediary of a tubular spacer 27 (Fig. 4) whose cross section matches that of turret portion 20'' at its lower end. The two halves 27a, 27b of spacer 27 can be interconnected by means of bolt 28 as shown in Fig. 3.

The upper turret portion 20' carries two sets of the usual dashboard instruments 29a, 29b which are connected in parallel, through a cable 30, to the various indicating devices (not shown) whose operation is to be registered on the instrument panel. These instruments are so oriented as to face the driver in the positions of Fig. 6 and Fig. 7, respectively, and represent the only instance of duplication of elements in a system according to our invention.

The turret 20 is traversed by two vertically aligned horizontal shafts 31, 32 and by a plurality of vertical rods 33, 34, 35, 36 and 37. A stud shaft 38 projects upwardly from the turret adjacent rod 37 and is coupled to the latter for inverse rotation through a pair of meshing gears 39, 40.

The upper end of rod 33, projecting from turret 20, is adapted to have a gear-shift lever 41 attached to it in two opposite positions as illustrated in Figs. 6 and 7. The lower end of this rod is adjustably clamped, through a handle 42, to an extension tube 43 leading to a speed-changing mechanism within a gear box 44 inside base 26; the clamping connection between rod 33 and tube 43 enables the transmission of both axial and rotary forces from lever 41 to gear box 44. Rod 34, which extends but a short distance into turret 20, carries on its projecting upper extremity an accelerator lever 45 which can also be fastened to this rod in two opposite positions, as illustrated in Figs. 6 and 7; an arm 46 on rod 34 transmits the movement of accelerator lever 45 to the usual throttle control (not shown) through a cable 47 and a linkage 48.

Figure 4:
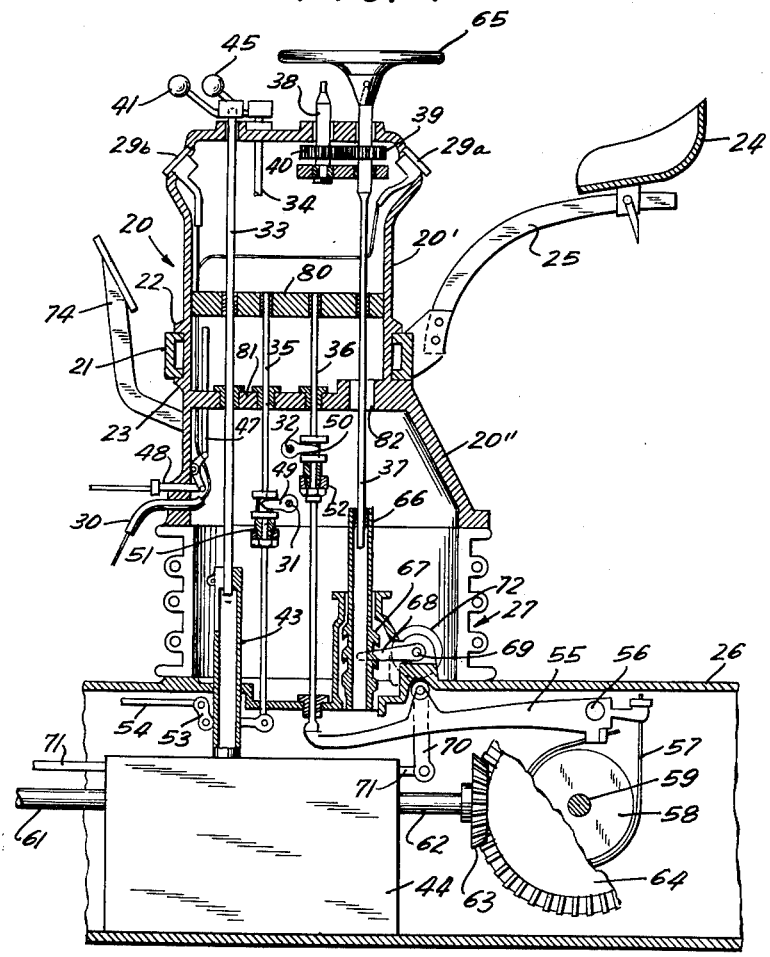
Fig. 4 is a view similar to Fig. 1 but showing the spacer in position.
Figure 5:
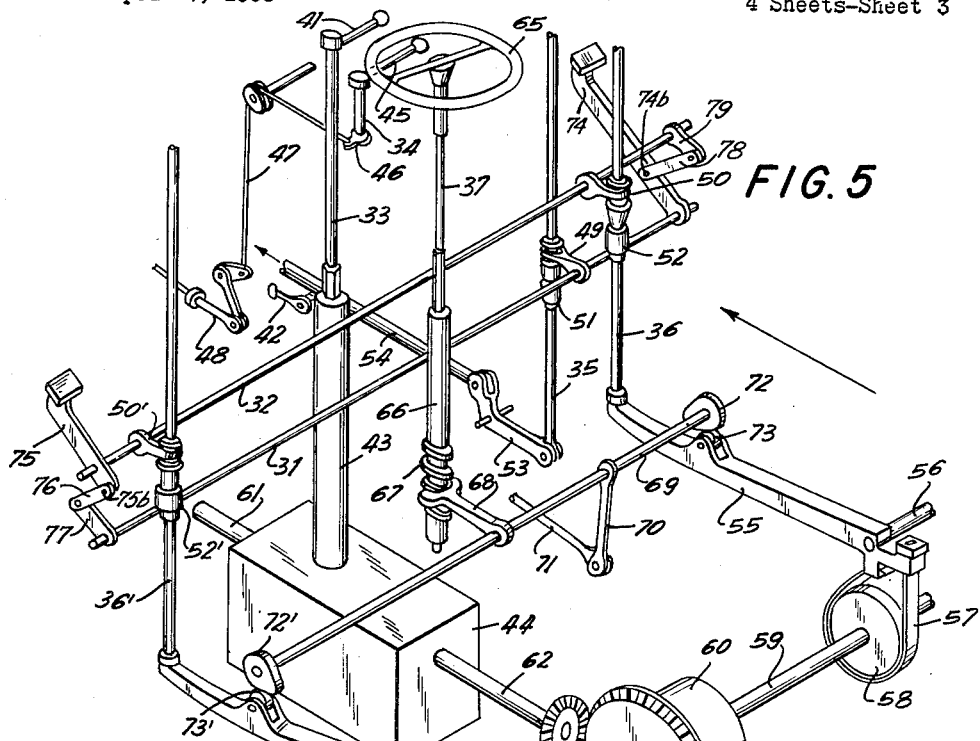
Fig. 5 is a perspective view of the controls and their associated mechanisms in forward-driving positions, with the turret removed.

The horizontal shafts 31 and 32 carry arms 49, 50 through which they are coupled, by means of adjustable stops 51, 52, with rods 35 and 36, respectively. This coupling is so arranged that clockwise rotation of shaft 32 or counterclockwise rotation of shaft 31 (as viewed in Figs. 1 and 4) depresses the associated rod 36 or 35. Rod 35 operates the clutch (not shown) of the vehicle through a bell-crank lever 53 and a horizontal rod 54. As shown in Fig. 5, rod 36 has a twin 36' which is controlled from the same shaft 32 through an arm 50' and an adjustable stop 52'. Rod 36, when depressed, bears upon a lever 55 which is pivoted at 56 and, when thus acted upon, tightens a band 57 about a brake drum 58;

rod 36' operates in identical manner a lever 55' which is pivoted at 56' and controls a similar band brake 57', 58'. Shafts 59 and 59', carrying the brake drums 58 and 58', respectively, receive their torque through the usual differential 60 from a motor (not shown) by way of a shaft 61, gear box 44, a shaft 62 and gears 63, 64.

Details of the adjustable stops on rods 35, 36, 36' are shown in Fig. 12 with particular reference to stop 52. This stop comprises a sleeve 52a whose two halves are clamped onto rod 36 by a nut 52b; the upper end of the sleeve forms a channel 52c engaged by a small roller 50a on each extremity of the bifurcate arm 50.

A steering wheel 65 is adapted to be mounted on the suitably profiled upper end of either the rod 37 or the stud shaft 38, depending on whether the driver's seat 24 is in the position of Fig. 6 or of Fig. 7. In either case, rod 37 acts as the steering column of the system and, through its splined or polygonal profile, transmits its rotation to a tubular extension 66 telescopically surrounding its lower end. Tube 66 is provided on its outside with a worm 67 forming a helicoidal channel engaged by the bifurcate end of an arm 68 fastened to a horizontal steering shaft 69; this shaft also carries an arm 70 linked to a rod 71 which controls the steering mechanism (not shown) of the vehicle.

A pair of cams 72, 72', mounted on opposite ends of steering shaft 69, co-act with rollers 73, 73' on levers 55, 55', respectively, in such manner that rotation of steering wheel 65 to the right depresses the lever 55 while leftward rotation of the steering wheel depresses the lever 55', thereby tightening one or the other of the two brake bands 57, 57'. This action slows down the rotation of the traction wheel on shaft 59 or 59' located on the inside of the curve taken by the vehicle, regardless of the direction of locomotion. The ends of shafts 31 and 32 project from both sides of turret portion 20" to receive two pedals 74, 75 each adapted to act as either a clutch pedal or a brake pedal. As shown in Figs. 8 and 9, pedal 74 is on the right of the driver and pedal 75 is on his left when the driving mount is assembled for travel in forward direction, i.e. in the direction of motor shaft 61. Under these conditions a bearing 75a of pedal 75 fits loose on brake shaft 32, which serves only as a pivot for this pedal and is not otherwise operatively connected therewith, while a pin 75b on this pedal is connected via a link 76 to an arm 77 keyed to clutch shaft 31 for movement in unison therewith whereby the shaft 31 is rotated as the pedal 75 is depressed by the left foot of the driver on seat 24 positioned as in Fig. 6; at the same time a bearing 74a on pedal 74 fits loose on clutch shaft 31, serving merely as a pivot therefor, while a pin 74b of the same pedal is connected via a link 78 to an arm 79 keyed to brake shaft 32 whereby the latter is rotated when pedal 74 is stepped on by the driver's right foot. For travel in the opposite direction, as seen in Figs. 10 and 11, pedal 74 is reversed on the shaft 31, so that the flat portion of this pedal now faces the driver on seat 24 positioned as in Fig. 7, and its bearing 74a is keyed onto shaft 31, the latter being thus positively connected with pedal 74 for rotation by the left foot of the driver, while pedal 75 is similarly reversed and directly keyed by its bearing 75a onto shaft 32 for rotation of this shaft by the driver's right foot, the linkages 76—79 not being used in this case and being consequently removed from the assembly. This insures correct rotation of both shafts 31, 32 in each instance.

Turret 20, which has been omitted in Figs. 5 and 8–11, is provided in its interior with two horizontal partitions 80, 81 forming bearings for the rods 33, 35, 36 and 37. It will be noted that the rods 35 and 36, whose upper extremities do not project beyond the turret, are long enough to remain guided in partition 80 even when the spacer 27 is in place as illustrated in Fig. 4. The upper portion of rod 33, passing through partitions 80 and 81, is round while its lower portion is advantageously profiled for positive rotary entrainment of tube 43, as best seen in Fig. 5. The profiled lower portion of rod 37, which in the position of Fig. 4 passes with clearance through a bore 82 in partition 81 wide enough to accommodate the tube 66, terminates below partition 80 which forms a bearing for the upper portion of this rod having a circular cross section.

It will thus be seen that we have provided a driving mount of great versatility which can be readily adjusted to different heights and opposite directions of travel with only minor rearrangements of its parts. Thus, only a raising of the stops 51, 52, 52' on their respective rods 35, 36, 36' is necessary when the spacer 27 is either inserted or removed; naturally, several such spacers of different height may be provided with equal facility to increase the number of possible adjustment steps.

It will be appreciated that the principles disclosed above may be utilized for an extension of the system to include additional controls, e.g. a hand brake whose mounting and mode of operation may be analogous to that of throttle control 45, 34, 47, 48; these and other modifications will be readily apparent to persons skilled in the art and are deemed to be embraced within the scope of the invention as defined in the appended claims.

We claim:

1. A reversible driving mount for an automotive vehicle provided with a pair of differentially interconnected traction shafts, comprising a turret, a steering column rising within said turret and having an extremity projecting from the upper end thereof, said column being provided with worm means, a stud shaft parallel to said column having an extremity projecting from the upper end of said turret, a steering wheel, said extremities forming alternative seats for said steering wheel respectively positioned more forwardly and more rearwardly of the vehicle, coupling means interconnecting said stud shaft and said column for rotation in opposite directions, steering mechanism controlled by said column, said steering mechanism including a control shaft extending transversely to said column and a coupling element on said control shaft engaging said worm means for transmitting a rotation of said column to said control shaft, said steering mechanism further including individual brake means for said traction shafts and cam means on said control shaft effective to operate either of said brake means upon rotation of said column in either of two opposite directions, a brake shaft extending transversely to said column across said turret, a brake pedal on said turret operatively linked with said brake shaft, and actuating means operatively connecting both of said brake means with said brake shaft.

2. The driving mount according to claim 1 wherein said column includes a profiled rod and a mating tube telescopically receiving said rod, further comprising a base supporting said turret and spacer means insertable between said base and said turret for varying the effective height of the latter, said steering mechanism being disposed in said base.

3. A driving mount for automotive vehicles, comprising a turret, a control rod rising within said turret, a shaft extending transversely to said rod across said turret, pedal means operatively linked with said shaft, coupling means for transmitting rotation of said shaft into vertical movement of said rod, said coupling means including an arm rigid with said shaft and adjustable stop means on said rod engaged by said arm, a base supporting said turret, and spacer means insertable between said base and said turret for varying the effective height of the latter, said stop means comprising a sleeve frictionally engaging said rod and a clamping nut releasably urging said sleeve into contact with said rod, said sleeve having a formation engaged by said arm.

4. In an automotive vehicle having a clutch and a brake, in combination, a turret, a first horizontal shaft extending across said turret and having two extremities projecting laterally therefrom, a second horizontal shaft extending parallel to said first shaft across said turret and having two extremities projecting laterally therefrom, a first and a second vertical rod rising within said turret, first coupling means operatively connecting said first shaft with said first rod, second coupling means operatively connecting said second shaft with said second rod, a first pedal having means for selectively mounting it on an extremity of said first shaft in either of two conditions including a fixed and a loose coupling with said first shaft, a second pedal having means for selectively mounting it on the other extremity of said second shaft in either of two conditions including a fixed and a loose coupling with said second shaft, first link means for operatively connecting said first pedal with said second shaft in its loosely mounted condition, second link means for operatively connecting said second pedal with said first shaft in its loosely mounted condition, and mechanism for operatively connecting said first and second rods with said clutch and said brake, respectively.

5. The combination according to claim 4, further including a base supporting said turret, said mechanism being located in said base, said first and second coupling means each including an adjustable stop on the respective rod, and spacer means insertable between said base and said turret for varying the effective height of the latter.

6. A driving mount for an automotive vehicle, comprising a turret, supporting means for a driver's seat displaceably mounted on said turret for maintaining said seat in either of two diametrically opposite positions whereby the vehicle can be driven in either of two directions, steering means on said turret operable by the driver in each of said positions, and mechanism for controlling the propulsion of the vehicle from each of said positions; said mechanism including first and second independently operable control means, a first and a second shaft respectively coupled with said first and second control means and extending across said turret in a direction transverse to the vehicle motion, a first and a second pedal detachably and reversibly fulcrumed on opposite sides of said turret, coupling means releasably connecting said first pedal with an adjacent extremity of said first shaft for rotating the latter upon actuation of said first pedal by one foot of the driver in one of said positions, the other extremity of said first shaft being connectable with said second pedal for rotation by said one foot in the other of said positions, and link means releasably connecting said second pedal with an adjacent extremity of said second shaft for rotation of the latter in a sense opposite to the rotation of said second pedal upon actuation thereof by the other foot of the driver in said one of said positions, said second shaft being also rotatable in said opposite sense by a mounting of said first pedal directly and non-rotatably upon the opposite extremity of said second shaft for actuation by said other foot in said other of said positions.

7. A driving mount for an automotive vehicle, comprising a turret, supporting means for a driver's seat displaceably mounted on said turret for maintaining said seat in either of two diametrically opposite positions whereby the vehicle can be driven in either of two directions, steering means on said turret operable by the driver in each of said positions, and mechanism for controlling the propulsion of the vehicle from each of said positions; said mechanism including first and second independently operable control means, a first and a second shaft respectively coupled with said first and second control means and extending across said turret in a direction transverse to the vehicle motion with extremities projecting from said turret, a first and a second pedal detachably and reversibly fulcrumed each on a corresponding extremity of said shafts and on opposite sides of said turret, coupling means releasably connecting said first pedal with said first shaft for rotating the latter upon actuation of said first pedal by one foot of the driver in one of said positions, the opposite extremity of said first shaft being connectable with said second pedal for rotation by said one foot in the other of said positions, said second pedal being freely swingable about said opposite extremity of said first shaft when in said one of said positions, and link means releasably connecting said second pedal with an adjacent extremity of said second shaft for rotation of the latter in a sense opposite to the rotation of said second pedal upon actuation thereof by the other foot of the driver in said one of said positions, said second shaft being also rotatable in said opposite sense by a mounting of said first pedal directly and non-rotatably upon the opposite extremity of said second shaft for actuation by said other foot in said other of said positions.

References Cited in the file of this patent

UNITED STATES PATENTS

| Number | Name | Date |
| --- | --- | --- |
| 1,533,093 | Booth | Apr. 14, 1925 |
| 1,641,802 | Danly | Sept. 6, 1927 |
| 2,198,407 | DeBrun | Apr. 23, 1940 |
| 2,324,992 | Riesing | July 20, 1943 |
| 2,388,873 | Schwab | Nov. 13, 1945 |
| 2,595,229 | Curtis | May 6, 1952 |
| 2,644,540 | Bolzer | July 7, 1953 |
| 2,728,463 | Beckwith | Dec. 27, 1955 |

FOREIGN PATENTS

| Number | Country | Date |
| --- | --- | --- |
| 725,871 | France | Feb. 22, 1932 |
| 684,380 | Great Britain | Dec. 17, 1952 |